United States Patent Office 2,772,314
Patented Nov. 27, 1956

2,772,314

PREPARATION OF SUBSTITUTED
CYCLOOCTATETRAENES

Hugh C. Campbell, Niagara Falls, N. Y., and Arthur C. Cope, Belmont, Mass., assignors to Research Corporation, New York, N. Y., a corporation of New York No Drawing. Application June 20, 1952,
Serial No. 294,731

15 Claims. (Cl. 260—666)

The present invention relates to the preparation of substituted cyclooctatetraenes by the copolymerization of substituted acetylenes with acetylene. The polymerization of acetylene to cyclooctatetraene and benzene is described in a paper by Reppe et al. in Annalen, 560, 1948. The preparation of substituted cyclooctatetraenes from cyclooctatetraene is described in a copending application of Cope and Kinter, Serial No. 206,924, filed January 19, 1951, now U. S. Patent No. 2,715,147.

As stated in the Cope and Kinter application, the properties of substituted cyclooctatetraenes are of considerable interest inasmuch as the structure is a symmetrical cyclic system of alternate double and single bonds possessing greater reactivity than the stable benzene ring. Substituted cyclooctatetraenes appear to be useful chemical intermediates and to possess ultraviolet absorption spectra which make them suitable as ultraviolet screening agents.

Prior developments concerning cyclooctatetraene, like the method described by Reppe et al., have limited application inasmuch as the objects thereunder were confined to the preparation of cyclooctatetraene and study of its chemical properties.

The process described in Cope and Kinter application used an organometallic compound reacting with the previously prepared cyclooctatetraene to prepare substituted cyclooctatetraenes. A polymerization of acetylene to cyclooctatetraene was thus a necessary precedent. The types of substituted cyclooctatetraenes made available by the above procedure are limited to those containing hydrocarbon substituents.

The principal object of this invention is the production of substituted cyclooctatetraenes directly by a single reaction of copolymerization of substituted acetylenes with acetylene.

A secondary object is the production of substituted benzenes by the copolymerization of substituted acetylenes with acetylene.

A further object is to provide a process to produce a wider range of substituted cyclooctatetraenes.

Still another object is to provide a method to produce a wide range of polysubstituted cyclooctatetraenes.

Other objects are to provide improvements in yield and increased economies in the preparation of substituted cyclooctatetraenes.

With the above and other objects in view, as will hereinafter appear, the present invention contemplates the copolymerization of acetylene and substituted acetylenes to form substituted cyclooctatetraenes and substituted benzenes.

As noted above, the polymerization of acetylene to cyclooctatraene is described by Reppe et al. in Annalen, 560, 1948, while according to the Cope and Kinter application, after obtaining cyclooctatetraene by the polymerization of acetylene, the cyclooctatetraene is then treated with organometallic compounds to obtain substituted cyclooctatetraenes.

According to the present invention, substituted cyclooctatetraenes are obtained directly by the copolymerization of acetylene with substituted actylenes. In general, the nature of the product depends on the substituted acetylenes used in the original material. Thus, if a monosubstituted acetylene is used, a monosubstituted cyclooctatetraene is obtained. 1,2-disubstituted cyclooctatetraenes may be obtained by using disubstituted acetylenes.

Our process involves a procedure similar to that described by Reppe, except for the inclusion of both acetylene and substituted acetylene in the starting material. Attempts to produce substituted cyclooctatetraenes directly by polymerization of substituted acetylenes have been made but so far as we are aware have proved unsuccessful. According to our invention, the presence of acetylene with the substituted acetylenes is essential. Thus, the acetylene and a monosubstituted acetylene combine in a 3–1 ratio to form a monosubstituted cyclooctatetraene. Substituted benzenes may be formed as an accompanying product by the combination of the reactants in a 2–1 ratio. Combination of a substituted acetylene with acetylene in a 2–2 or 1–3 ratio forms polysubstituted cyclooctatetraenes, while combination in a 1–2 ratio forms polysubstituted benzenes.

The invention also involves copolymerization of mono- and 1,2-disubstituted acetylenes with acetylene which provides a direct synthesis of mono- and 1,2-disubstituted cyclooctatetraenes. Methylcyclooctatetraene, n-propylcyclooctatetraene, n-butylcyclooctatetraene, phenylcyclooctatetraene and 1,2-dimethylcyclooctatetraene have been prepared by this method. The monosubstituted cyclooctatetraenes were identified by quantitative reduction to cyclooctane derivatives or by direct comparison with authentic samples, like identity of boiling points, index of refraction, or infrared spectra or combinations thereof, while 1,2-dimethylcyclooctatetraene was characterized by reduction to 1,2-dimethylcyclooctene, which was converted to decane-2,9-dione by ozonization.

According to one procedure for copolymerization, the substituted acetylene (20–50 g.) is included with a solvent, advantageously tetrahydrofuran (200–250 g.), or in some instances the substituted acetylene may serve as a solvent, in which case the extraneous solvent may be omitted, with calcium carbide and a catalyst, such as nickel cyanide or a nickel chelate like nickel acetylacetonate, in a 1-liter stirred autoclave.

The air in the system is displaced with acetylene, and the mixture is stirred and heated at 70–90° centigrade for 7 to 12 hours at a pressure of 300–150 p. s. i. maintained by repressuring with acetylene at frequent intervals as polymerization proceeds and the pressure drops. The mixture is steam distilled until about 2 liters of distillate is collected to separate volatile material (tetrahydrofuran, benzene, cyclooctatetraene, a substituted benzene and all or part of the substituted cyclooctatetraene, depending upon its volatility) from a water-insoluble residue (largely cuprene from polymerization of acetylene). The water-insoluble portion of the residue is separated by filtration, and extracted in a Soxhlet apparatus for 24 hours with benzene containing a small amount of hydroquinone as a polymerization inhibitor. The benzene extract is concentrated and distilled, and the crude distillate is combined with the residue obtained by fractionation of the organic portion of the steam distillate (after the benzene and cyclooctatetraene present have been removed as low-boiling fractions). The substituted cyclooctatetraenes are purified by fractional distillation through silver nitrate complexes, or by a combination of both processes.

Detailed procedures for obtaining specific products, as we have actually carried them out, are described below, with reference to the following chart:

| | |
|---|---|
| I. | R=CH$_3$ |
| II. | R=n—C$_3$H$_7$ |
| III. | R=n—C$_4$H$_9$ |
| IV. | R=C$_6$H$_5$ |

Methylcyclooctatetraene, I in the foregoing diagram, was produced by the copolymerization of propyne with acetylene, 30 grams being suitable for the purpose. The propyne was dissolved in 250 g. of tetrahydrofuran (which had been cooled with Dry Ice and trichloroethylene) and placed in the 1 liter autoclave, which was also cooled with Dry Ice. The copolymerization procedure described above was followed, with displacement of the air in the system before the mixture warmed to 0° to avoid loss of propyne. All of the product was isolated by fractionation of the organic portion of the steam distillate through a 45 x 1.5-cm. glass helix-packed column, which yielded benzene, toluene, about 40 g. of cyclooctatetraene and 14.1 g. (16%) of methylcyclooctatetraene. A pure sample of I was obtained by conversion to the crystalline silver nitrate complex, described below, regeneration by shaking with a 100% excess of concentrated ammonium hydroxide, extraction with pentane and redistillation. The silver nitrate complex was prepared by adding 30.5 g. of finely powdered silver nitrate to a solution of 14.1 g. of I in 200 ml. of boiling absolute ethanol. The mixture was stirred and heated until all the silver nitrate dissolved, cooled, and filtered to separate the complex, which was washed on the funnel with dry ether. The yield was 40.0 g. (90%), M. P. 120–123°. Recrystallization from absolute ethanol followed by washing with ether and brief drying in a vacuum desiccator yielded the methylcyclooctatetraene-silver nitrate complex as compact light-yellow prisms with a constant melting point of 123–124.5° (opaque melt).

n-Propylcyclooctatetraene, II in the above diagram, was obtained by the employment of 1-pentyne, 27 grams being suitable, in the copolymerization with acetylene according to the general procedure outlined above. The organic layer in the steam distillate was dried over magnesium sulfate and fractionated through a 15 x 1.5-cm. glass helix-packed column, separating benzene and 58 g. of cyclooctatetraene from the crude product. A small amount of n-propylbenzene was isolated from the fraction intermediate in boiling point between cyclooctatetraene and n-propylcyclooctatetraene by the procedure used to isolate toluene from the methylcyclooctatetraene preparation.

The high-boiling fraction from the steam distillate and the crude product obtained from the benzene extract of the residue from the steam distillate were combined and distilled, and yielded 23.2 g. of crude II, B. P. 83–94° (16 mm.). A solution of this crude product in 350 ml. of absolute ethanol was boiled with 54 g. of finely powdered silver nitrate until a homogeneous solution was obtained. The silver nitrate complex that separated on cooling was collected on a filter and decomposed by shaking with 50 ml. of pentane, 50 g. of ice, and 60 ml. of concentrated ammonium hydroxide. The aqueous layer was extracted with 25 ml. of pentane, and the combined pentane solutions were washed with water, dried over magnesium sulfate, concentrated and the residue was distilled. The yield of n-propylcyclooctatetraene was 14.4 g. (25%).

n-Butylcyclooctatetraene, III in the above diagram, was realized by the copolymerization of 1-hexyne, in the selected amount of 20 grams, with acetylene by the general procedure common to the foregoing. The organic layer of the steam distillate was dried over magnesium sulfate and distilled through an 18 x 1.8-cm. glass helix-packed column to separate benzene and 54 grams of cyclooctatetraene from crude III, which after distillation amounted to 12.9 grams. An additional 6.2 grams was isolated from the benzene extract of the residue from the steam distillation. These crude fractions of III were combined, dissolved in pentane, washed with 85% phosphoric acid to remove azulene, and then extracted with two 20-ml. portions and twelve 10-ml. portions of 50% (by weight) aqueous silver nitrate to separate III from cis-1-phenyl-1,3-butadiene. n-Butylcyclooctatetraene was regenerated from the silver nitrate extracts by treatment with an excess of ammonium hydroxide, with cooling, and fractionated through a 15 x 1.5-cm. column packed with glass helices. The yield of III was 6.17 grams (16%).

Phenylcyclooctatetraene, IV in the above diagram, was prepared by the copolymerization of phenylacetylene, 20 grams deemed suitable, with acetylene by the general procedure described above, except that 5 grams of nickel cyanide was used in place of nickel acetylacetonate as the catalyst. The crude product isolated from the steam distillate and from the benzene extract of the residue from the steam distillation was converted to the crystalline silver nitrate complex by a procedure generally similar to the one heretofore described, and subsequently regenerated from the adduct by treatment with ammonium hydroxide. Distillation through a semimicro column yielded 6.1 grams (17%) of I.

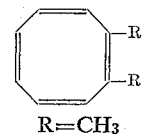

| | |
|---|---|
| V. | R=CH$_3$ |

1,2-dimethylcyclooctatetraene, V in the diagram immediately above, was obtained by the copolymerization of 2-butyne, 25.5 grams being suitable, with acetylene by the general procedure heretofore outlined. All of the product was isolated from the organic layer of the steam distillate, which was dried over magnesium sulfate and fractionated through a 15 x 1.5-cm. glass helix-packed column. Benzene, o-xylene and 52 grams of cyclooctatetraene were separated as low-boiling fractions, followed by 11.7 grams (19%) of 1,2-dimethylcyclooctatetraene. A sample of V was regenerated from its crystalline silver nitrate complex in a fashion similar to the one previously described.

As isomeric mixture of dimethylcyclooctatetraenes, containing various position isomers such as the 1,2-, 1,3-, 1,4-, and 1,5-dimethyl derivatives, was collected by combining and refractionating the higher boiling fractions obtained from several methylcyclooctatetraene preparations. A pentane solution of 1.05 grams of the mixture of isomers was extracted into 20 ml. of 50% aqueous silver nitrate (to separate any cis-1-phenyl-1,3-butadiene that might have been present), and the hydrocarbons were regenerated from the extract by shaking it with 15 ml. of pentane, 10 grams of ice and 25 ml. of concentrated ammonium hydroxide. The pentane layer and a pentane extract of the aqueous layer were washed with water, dried over magnesium sulfate, concentrated, and the residue was distilled through a semi-micro column. The product was identified as a mixture of dimethylcyclooctatetraenes by analysis, quantitative hydrogenation, and ultraviolet and infrared absorption spectra.

From the foregoing description of specific examples, it will be seen that substituted cyclooctatetraenes and benzenes may be prepared in a wide variety, depending on the substituents of the substituted acetylenes. The catalyst may be of any type found useful in promoting a cyclic polymerization reaction of acetylenes and/or substituted acetylenes and is preferably a nickel-containing substance, since the element nickel in ionic combination is believed to be the effective catalytic agent. Particularly effective catalysts are of the homogeneous type and therefore should be soluble in the materials used in the process. They may be modified by reaction with the acetylene and/or the substituted acetylene in the polymerization process.

The solvent is in general an anhydrous solvent capable of dissolving the acetylene, the substituted acetylenes, and the catalyst. Solution of the acetylene is necessary for stability, since the pressures are sufficient to maintain the acetylene in the liquid phase. The substituted acetylenes may be gaseous, liquid or solid at ordinary temperatures. Solvents such as ether, benzene, or acetone may be used, and tetrahydrofuran has been found satisfactory in practically all instances. The substituted acetylenes themselves, when liquid, may also be used as the solvent, in which case the separate solvent may be omitted.

It will be understood that the foregoing examples are illustrative only. While batch processes are described, the invention is not limited thereto, but may be embodied in continuous processes.

Having thus described the invention, we claim:

1. The method of preparing substituted cyclooctatetraenes which consists in the copolymerization at elevated temperature and pressure of acetylene with substituted acetylenes wherein the substituent is a hydrocarbon radical in the presence of a catalyst containing nickel in ionic combination and an anhydrous organic solvent.

2. The method of preparing substituted cyclooctatetraenes which consists in the copolymerization of acetylene with substituted acetylenes wherein the substituent is a hydrocarbon radical in the presence of a nickel salt catalyst and a solvent.

3. A disubstituted cyclooctatetraene of the formula

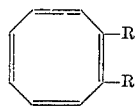

where R is a hydrocarbon radical.

4. A disubstituted cyclooctatetraene of the formula

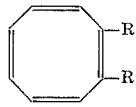

where R is a methyl radical.

5. The method of preparing substituted cyclooctatetraenes which consists in the copolymerization at elevated temperature and pressure of acetylene with substituted acetylenes wherein the substituent is a hydrocarbon radical in the presence of calcium carbide and a catalyst selected from the nickel compound group.

6. The method of preparing substituted cyclooctatetraenes which consists in the copolymerization at elevated temperature and pressure of acetylene with substituted acetylenes wherein the substituent is a hydrocarbon radical in the presence of calcium carbide and a catalyst selected from the group consisting of nickel chelate and nickel cyanide, and a substantially anhydrous solvent, said solvent being selected from the group consisting of tetrahydrofuran, ether, benzene and acetone.

7. The method of preparing substituted benzenes which consists in the copolymerization at elevated temperature and pressure of acetylene with substituted acetylenes wherein the substituent is a hydrocarbon radical in the presence of calcium carbide and a catalyst selected from the nickel compound group, and a substantially anhydrous solvent.

8. The method of preparing disubstituted cyclooctatetraenes which comprises the copolymerization of acetylene and a disubstituted acetylene wherein the substituent is a hydrocarbon radical dissolved in an anhydrous organic solvent containing a catalyst having nickel in ionic combination at 70° to 90° C. under a pressure of 150 to 300 pounds per square inch.

9. The method of preparing substituted cyclooctatetraenes by the copolymerization of acetylene and substituted acetylenes which comprises the steps of mixing a substituted acetylene wherein the substituent is a hydrocarbon radical calcium carbide and a catalyst containing nickel in ionic combination with an anhydrous organic solvent selected from the group consisting of ether, benzene, acetone and tetrahydrofuran in a closed chamber, flushing air from the chamber with acetylene gas under pressure, heating the mixture to 70° to 90° C., and maintaining a pressure of 150 to 300 pounds per square inch by adding acetylene at intervals.

10. The method of preparing methylcyclooctatetraene which comprises the copolymerization of acetylene with propyne dissolved in tetrahydrofuran as a solvent in the presence of nickel acetylacetonate as a catalyst at 70° to 90° C. under a pressure of 150 to 300 lbs. per square inch, steam distilling the resultant mixture to separate volatile material, and isolating methylcyclooctatetraene by fractionation of the steam distillate.

11. The method of preparing n-propylcyclooctatetraene which comprises the copolymerization of acetylene with 1-pentyne dissolved in tetrahydrofuran as a solvent in the presence of nickel acetylacetonate as a catalyst at 70° to 90° C. under a pressure of 150 to 300 pounds per square inch, steam distilling the resultant mixture to separate volatile material, and isolating n-propylcyclooctatetraene by fractionation of the steam distillate.

12. The method of preparing n-butylcyclooctatetraene which comprises the copolymerization of acetylene with 1-hexyne dissolved in tetrahydrofuran as a solvent in the presence of nickel acetylacetonate as a catalyst at 70° to 90° C. under a pressure of 150 to 300 pounds per square inch, steam distilling the resultant mixture to separate volatile materials, extracting the residue from the steam distillation with benzene, and isolating n-butylcyclooctatetraene from the steam distillate and the benzene extract by fractionation.

13. The method of preparing phenylcyclooctatetraene which comprises the copolymerization of acetylene with phenylacetylene dissolved in tetrahydrofuran as a solvent in the presence of nickel cyanide as a catalyst at 70° to 90° C. under a pressure of 150 to 300 pounds per square inch, steam distilling the resultant mixture to remove volatile materials, extracting the residue from the steam distillation with benzene, and isolating phenylcyclooctatetraene from the steam distillate and the benzene extract by fractionation.

14. The method of preparing 1,2-dimethylcyclooctatetraene which comprises the copolymerization of acetylene with 2-butyne dissolved in tetrahydrofuran as a solvent in the presence of nickel acetylacetonate as a catalyst at 70° to 90° C. under a pressure of 150 to 300 pounds per square inch, steam distilling the resultant mixture to separate the volatile materials, and isolating 1,2-dimethylcyclooctatetraene by fractionation of the steam distillate.

15. The method of preparing substituted cyclooctatetraenes which consists of the copolymerization at elevated temperature and pressure of acetylene with substituted acetylene wherein the substituent is a hydrocarbon radical in the presence of calcium carbide and a catalyst selected from the group consisting of nickel chelate and nickel cyanide, and a substantially anhydrous solvent selected from the group consisting of tetrahydrofuran, ether, benzene and acetone.

References Cited in the file of this patent

UNITED STATES PATENTS

| | | |
|---|---|---|
| 2,579,106 | Barnes | Dec. 18, 1951 |
| 2,613,231 | Canale et al. | Oct. 7, 1952 |

OTHER REFERENCES

Cope et al.: Jour. Am. Chem. Soc., vol. 73, Mar. 1951, pp. 1195–1198.

Jour. Amer. Chem. Soc., vol. 73 (1951), pages 3536–37, Cope and Campbell article.